United States Patent [19]

Häberle

[11] 4,280,907
[45] Jul. 28, 1981

[54] SEPARATING DEVICE

[76] Inventor: Wilhelm Häberle, Industriegelände, 7487 Scheer, Wurtt, Fed. Rep. of Germany

[21] Appl. No.: 66,513

[22] Filed: Aug. 14, 1979

[51] Int. Cl.³ .............................................. B01D 33/00
[52] U.S. Cl. .................................... 210/408; 264/140; 366/83; 425/197
[58] Field of Search .................. 210/184, 488, 408; 264/DIG. 69, 140, 141, 37; 425/197, 198, 199; 366/79, 83; 100/117, 145, 146, 147, 148, 149, 150

[56] References Cited

U.S. PATENT DOCUMENTS

| 2,810,339 | 10/1957 | Satzinger | 100/147 |
| 3,092,017 | 6/1963 | Tronih et al. | 100/117 |
| 3,568,842 | 3/1971 | Bozek | 210/488 |
| 3,595,162 | 7/1971 | Heinrich | 100/148 |
| 3,784,015 | 1/1974 | Kasten | 210/488 |
| 3,827,568 | 8/1974 | Toth et al. | 210/488 |
| 4,104,958 | 8/1978 | Manser | 425/198 |
| 4,117,776 | 10/1978 | Hunt | 100/147 |
| 4,174,198 | 11/1979 | Kinoshita | 425/197 |
| 4,177,234 | 2/1979 | Lowry | 264/141 |

Primary Examiner—Theodore A. Granger
Attorney, Agent, or Firm—McGlew and Tuttle

[57] ABSTRACT

A separating device for separating materials from each other having different melting points, particularly a mixture of plasticized and non-plasticized solid material, includes a housing having a bore and a plurality of successively arranged disc within the bore. The discs are located relative to each other and are of such configuration as to define screening gaps. The plasticized material is separated by passage through the screening gaps as the mixture including substantially all of the solid material passes through the bore.

4 Claims, 9 Drawing Figures

SEPARATING DEVICE

FIELD AND BACKGROUND OF THE INVENTION

The invention relates in general to a device for separating from each other materials having different melting points and capable of being plasticized in an extruder, which is particularly suitable for regenerating waste of plastics coated with a metal foil.

In the industry of consumer goods, plastics sheets coated or sealed with metal, particularly aluminum foils are employed at a rapidly growing rate. For reasons of economy, importance is increasingly attached to the regeneration of the considerable waste produced in this connection, primarily in the form of great shaped stampings.

With waste from aluminum coated plastic sheets, which occurs in large quantities, to be able to re-use the plastic, the aluminum is separated from the plastic by means of extruders equipped with metal screens. The material to be regenerated is plasticized in the extruder and pressed through a screening provided at the outlet thereof. The non-plasticized portions are caught in the screen meshes, while the plasticized material passes therethrough. In the prior art separators, however, the apertures of the screen become very soon clogged by the trapped metal, so that the screen must repeatedly be exchanged.

For this purpose, sliding frames are provided in which these screens are inserted to be introduced into the discharge channel of the extruder, however, in the regeneration of aluminum coated sheet waste, for example, the screens clog already after about 30 seconds. Therefor, they must permanently and recurrently exchange to prevent their destruction. This is not only very expensive but also very disturbing in the production, since no continuous operation is possible.

SUMMARY OF THE INVENTION

The invention provides a device for separating from each other materials having different melting points, which does not have the mentioned drawbacks.

A principal objective is to make possible the continuous separation of the material to be regenerated from dirt and foreign matter, without the necessity of substantial assistance and constant supervision of the device. Further objectives are a high throughput capacity, a high degree of purification, and versatility in application.

In accordance with the invention an apparatus for separating a plasticized material from a mixture of plasticized material and non-plasticized solid material is provided. In accordance with an embodiment of the invention the apparatus comprises a tubular housing having a bore extending therethrough intermediate an entrance end for receiving the mixture and an exit end for discharging at least part of the mixture including the solid material, and a discharge port extending from the bore through the wall of the housing for discharging at least part of the plasticized material of the mixture. A plurality of annular discs are successively arranged within the bore, each of the discs has a central aperture extending between its side faces and the discs are shaped and located relative to each other so as to define a passage between adjacent side faces of successive discs. The passages are dimensioned adjacent to the bore to screen the passage from receiving the non-plasticized solid material. A screw member rotatably mounted on the housing and disposed within the bore through each aperture of the disc is operative to convey the part of the mixture including the solid material along the bore and to expel a part including only plasticized material into the passage from the bore and out of the housing.

In accordance with another embodiment of the invention, a screening device for separating a plasticized material from a mixture of plasticized material and non-plasticized solid material includes a plurality of successively arranged annular discs having opposite side faces, each disc having a peripheral surface and a central aperture extending between its side faces defining an inner surface. The discs are concentrically aligned about a central axis so that the inner surfaces define a central bore. The discs are shaped and located relative to each other so as to define a passage between adjacent side faces of the successive discs. The passage is dimensioned to screen the passage from receiving the non-plasticized solid material. Means for pressurizing the mixture and delivering the pressurized mixture to at least one of the surfaces of the disc so as to expel at least part of the plasticized material through the passage and convey at least part of the mixture including substantially all of the solid material away from the passage is provided.

In accordance with still another embodiment of the invention a method of separating a plasticized material from a mixture of plasticized material and non-plasticized solid material using a screening device according to the invention includes the steps of passing the mixture under pressure adjacent to at least one of the surfaces of the excessively arranged discs to expel at least a part of the plasticized material from the surface into and through the passage and to convey at least part of the mixture including substantially all of the solid material along the surface.

The inventive device is not only very simple in construction and therefore easy to manufacture but also very effective in operation and makes it possible to separate particularly metal parts from plasticized plastics with a high in-service reliability. That is, if the separator comprises a separating head in which separating discs are inserted having or forming radially extending, differently designed scaling gaps, the separating discs act, to a certain extent, as a screen. While passing through the separating head, the material plasticized in the extruder and including the foreign matter is pressed through screening gaps, but the non-plasticizable solid matter is withheld at the gaps, so that in this way, the separation is easy.

The area of the screening gaps predetermines the size of the particles to be separated. Due to the design of a screening basket, which is an assembly of a plurality of separating discs, the width of the gaps can be greatly reduced at very low cost and, in spite of that, dimensioned accurately since the separating edges need only to be correspondingly set back relative to the front faces or the recesses be correspondingly dimensioned, to insure an almost complete separation of foreign matter from the plasticized material.

The use of separating discs provided with separating edges or recesses results in a high throughput capacity because high pressures can be provided without a risk of damaging the screening basket. Further, no maintenance is necessary, so that the inventive device insures both a high economy and versatility and continuous separation. If, for example, the temperature in the extruder and the separator head is maintained at a level such that with a granular material consisting of two or more plastics, only one of the plastics is plasticized under heat, the separating head makes it possible to separate from each other even plastics of different compositions.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
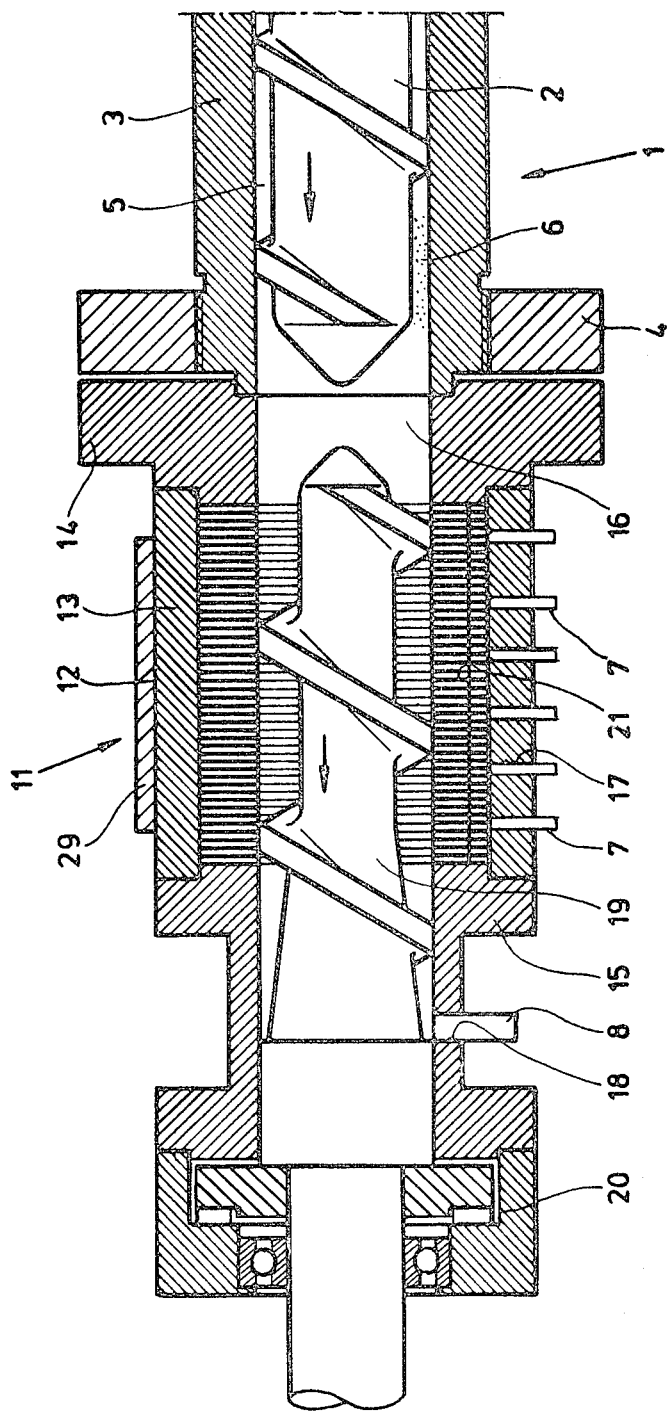
FIG. 1 is an axial section of the separating head forming the separating device attached to an extruder.

Referring now to the drawings in particular, the invention embodied therein comprises as best shown in FIG. 1 a separating head 11, which is preferably attached to an extruder 1, for separating a plasticized material from a mixture of non-plasticized solid material and plasticized material which is directed therethrough. For this purpose, separating rings or discs 21 forming screening gaps, described in detail hereinafter, are successively arranged in a housing 12 which includes a cylindrical jacket 13 intermediate two flanges 14 and 15. The discs in the embodiment illustrated in FIG. 1 are fixed between flanges 14, 15. A mixture 6 of the plasticized and non-plasticized solid material is fed through a channel 5 in the extruder 1 by an extruder screw 2 disposed within an extruder jacket 3 of the extruder 1. The separating head 11 is connected to a flange 4 of extruder jacket 3. The mixture 6, in which the foreign or other solid matter to be separated is embedded, is pressed into a conveying channel 16 of the separating head and a purified material 7 can flow through separating gaps 27 to outlet ports 17 extending through the jacket 13, while the foreign matter is withheld by separating head 11 and passes to the outside as waste 8, through outlet end or ports 18 which in the illustrated embodiment is provided in flange 15.

Figure 3:
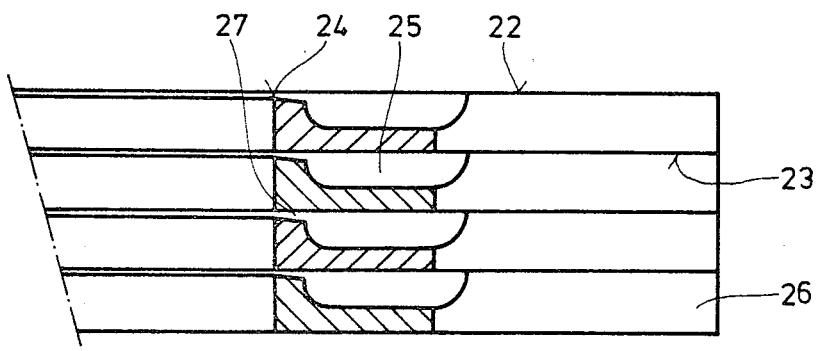
FIG. 3 is an enlarged sectional view taken along the line III—III of FIG. 2, illustrating a plurality of separating discs forming the separating basket.

Each of said discs may be a substantially flat annular ring. To form the screening gaps 27, between the individual separating discs 21, each disc is preferably provided, on one of its faces 22, 23, at its inner edge with a recessed, circular separating bevel 24 which is surrounded, radially outwardly, by an adjacent circular collecting channel 25 formed in the face 22 or 23 or both. As best shown in FIG. 3, the circular separating edge 24 cooperates with the face of an adjacent disc 23 to form a screening gap. In addition, in each separating disc 21, a notch 26 extends radially up to the collecting channel 25. As separating discs 21 are successively assembled and received in housing 12, notches 26 are aligned with each other. In this way, the plasticized, purified material can pass through screening gaps 27, collecting channels 25, and the channel formed by notches 26 and extending in the axial direction, to outlet ports 17.

The purified materials 7 may be discharged from separating head 11, which may be heated by means of a heating strip 29 mounted on and partly or completely surrounding the housing 12 in order to prevent the plasticized material from cooling down and to keep it fluid in the form of strands which are than again fragmented into a usable granular material, by means of a crusher or the like. As a matter of course, a profiling tool, die, or nozzle may also be attached to the housing jacket 12 to cause discharge material 7 to form a profiled strand or a foil.

Figure 4:
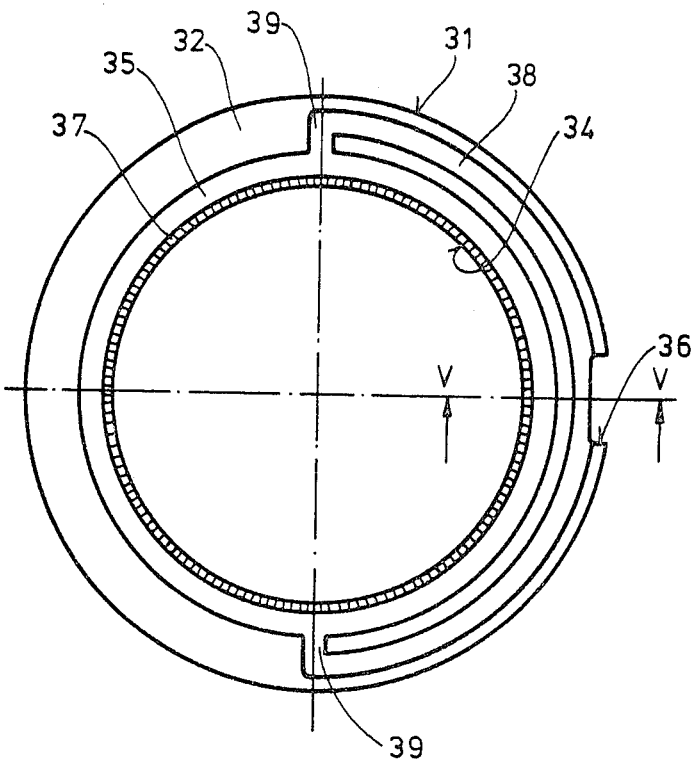
FIG. 4 is a view similar to FIG. 2, illustrating another embodiment of a separating disc.
Figure 5:
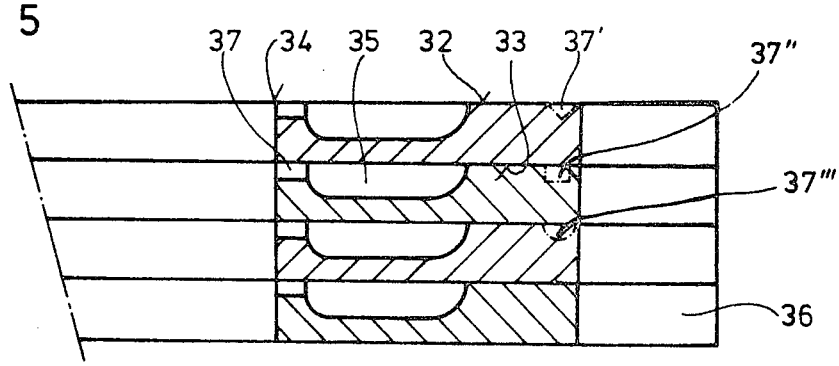
FIG. 5 is an enlarged sectional view taken along the line V—V of FIG. 4.

In the embodiment illustrated in FIG. 4 or FIG. 5, screening gaps 37 are formed by recesses 37', 37'', or 37''' which may have a triangular, rectangular or semi-circular section. Separating discs 31 contact one another by their front faces 32, 33 so that unwanted matter in the plasticized material is trapped at an inner separating edge 34 and only the purified material can pass through recesses 37', 37'', 37''' into collecting channel 35.

Figure 2:
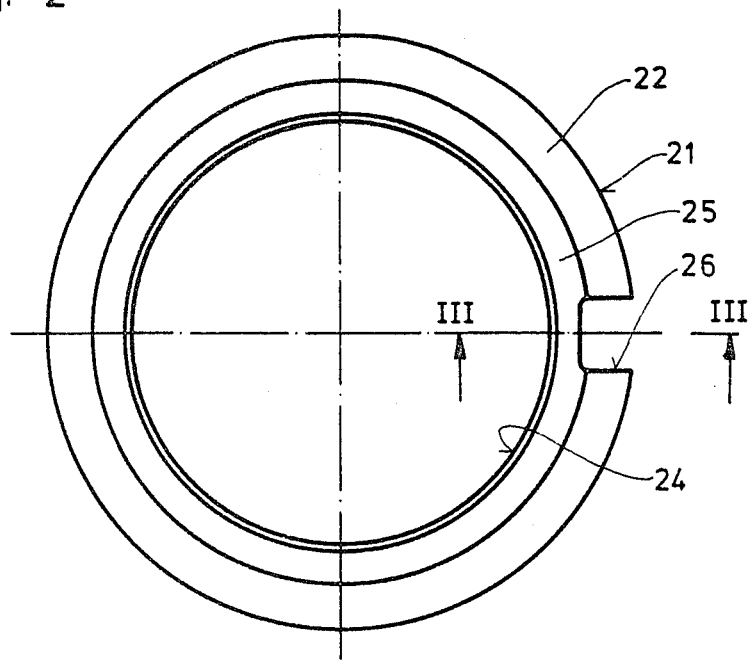
FIG. 2 is a side elevational view of a separating disc used in the separating head according to FIG. 1.

To compensate for the high load, circular channel 35 is surrounded by another semi-circular channel 38 which communicates with channel 35 through two recesses 39 formed in a face 32 of separating disc 31, and opens into a discharge channel formed by the alignment of notches 36. This arrangement, of course, may also be provided in the embodiment of FIG. 2.

To remove the solid matter from the separating head withheld withon the conveying channel 16 by screening gaps 27 or 37, a conveying screw member 19 is provided in conveying channel 16. The conveying screw member is driven by a motor (not shown) and carries the solid matter to pass to outlet port 18. Conveying screw 19 is supported by a bearing 20 and serves at the same time as a means for cleaning screening gaps 27, since at every revolution, the accumulating material is advanced by the screw thread. This insures an operation without disturbances.

Figure 6:
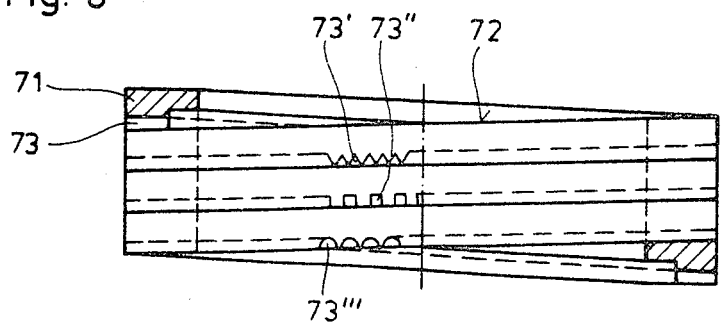
FIG. 6 illustrates separating discs formed of a wound strip.

In the embodiment illustrated in FIG. 6, a separating disc 11 is formed by the strip 72 having a rectangular cross-section and wound helically about a central axis 75. The screening gaps 73, for example, are impressed as indentations in strip 72 and through which the purified material passes from the inside to the outside, are designed as triangular, square or semi-circular recesses 73', 73'' or 73'''.

Figure 7:
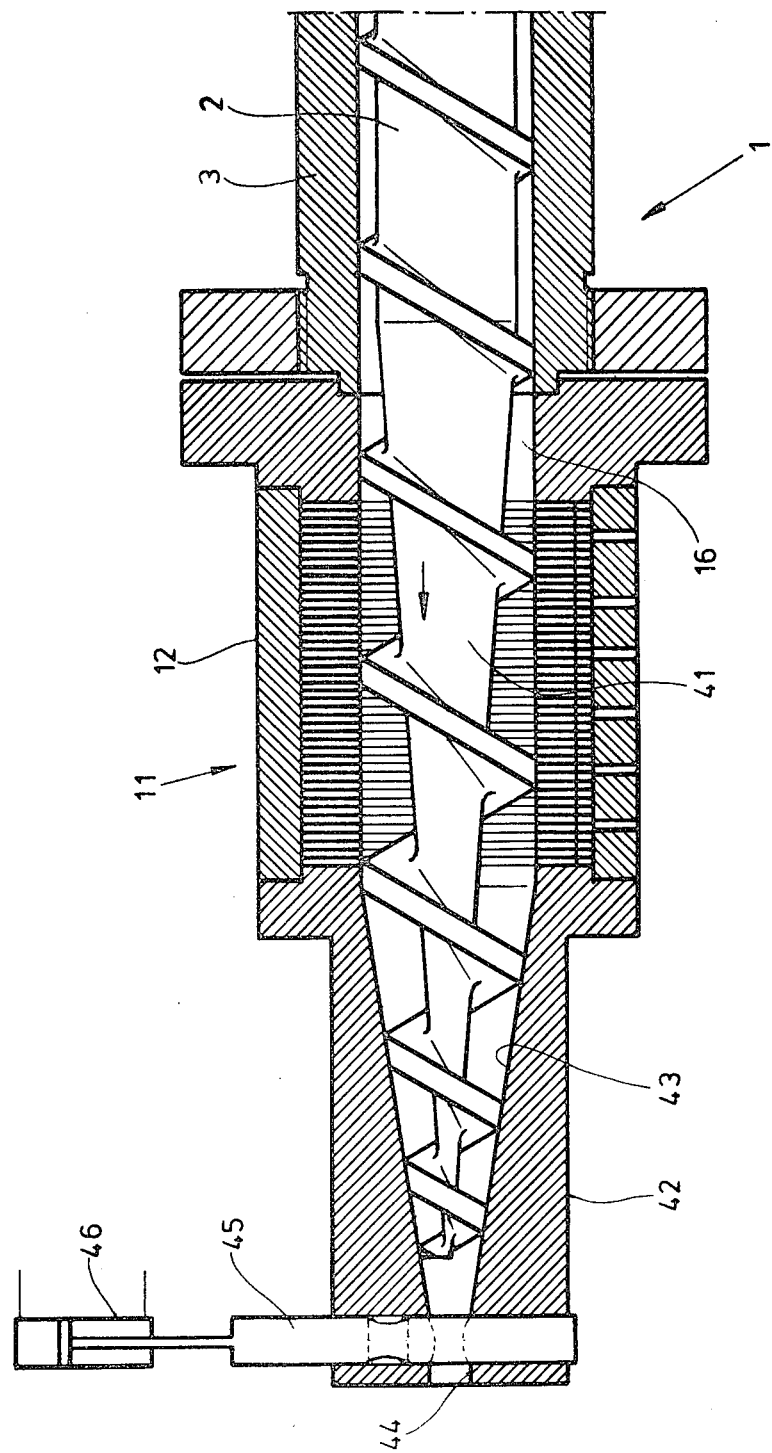
FIG. 7 is a view similar to FIG. 1 showing the extruder screw engaged in the separating head.

In the embodiment of FIG. 7, screw 2 of extruder 1 is provided with an extension 41 engaging in separating head 11. In addition, extension 41 projects into a hollow 43 of a flange 42 which terminates housing 12 and which includes an outlet opening 44 extending concentrically of separating head 11. Opening 44 can be adjusted by a slide 45 actuated by a servo mechanism 46 in the form of the fluid operated cylinder and piston unit.

The material withheld by the screening gaps is thus advanced by extruder screw 2, whose extension 41 is tapered in conformity with hollow 43, directly to opening 44 which is opened intermittently or automatically in dependence on the dynamic pressure. At the same time the screening gaps are cleaned by screw 2.

Figure 8:
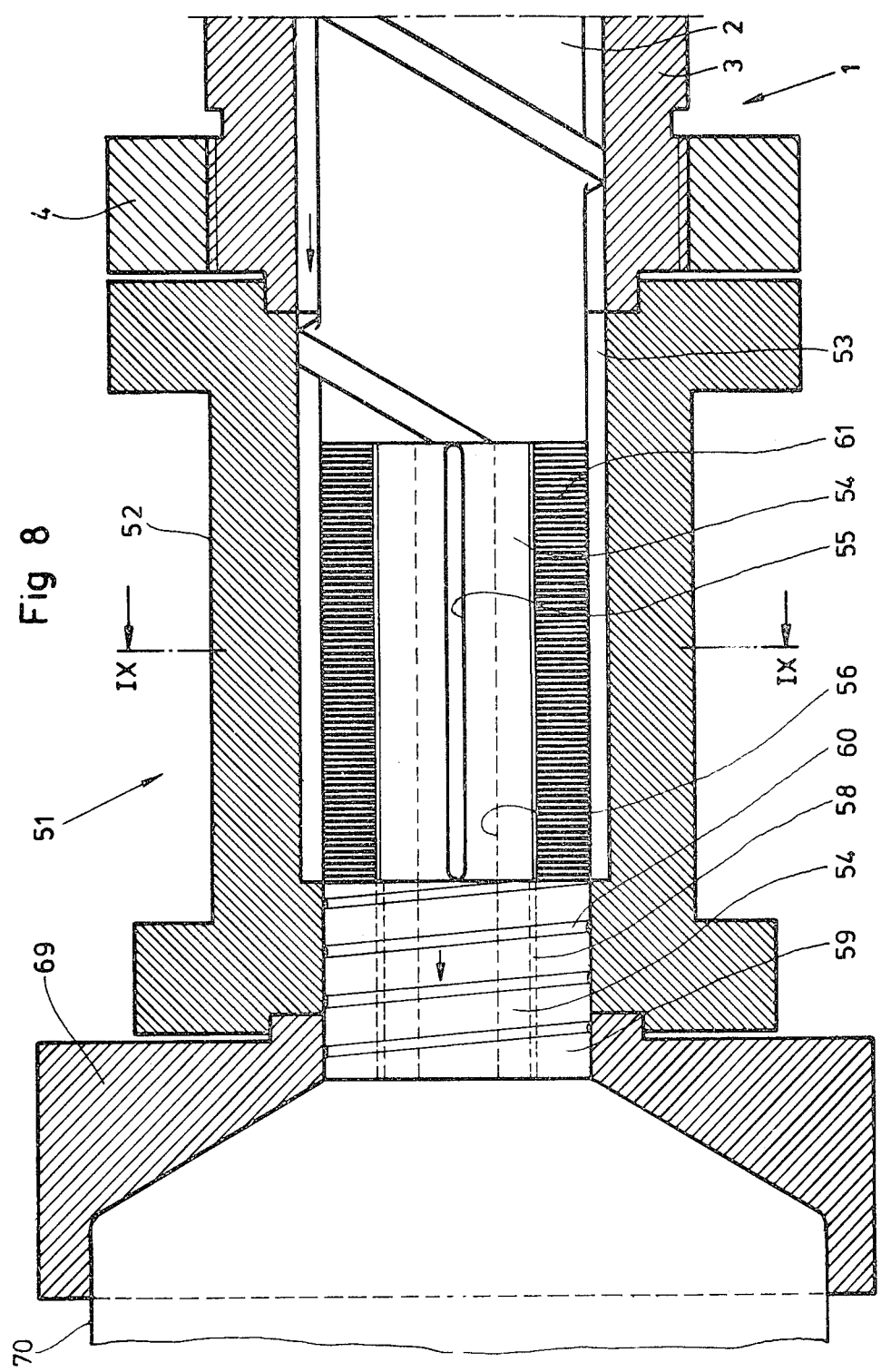
FIG. 8 illustrates still another embodiment of a separating head.

The separating head 51 shown in FIG. 8 comprises a housing 52 in which separating discs 61 are successively inserted. A portion of front face 62 (FIG. 9) of disc 61 is recessed so that a circular separating edge 63 as well as channel 64 are formed in the outer zone, in this embodiment.

The separating discs 61 are arranged on a sleeve shaped extension 54 of extruder screw 2 which is provided with a thread 58 and carries a nut 59 screwed thereon. A nut 59 tightens separating discs 61 and seals the conveying channel 53 of separating head 11 by means of an outer thread 60 worked in the nut.

In the separating head of FIG. 8, the plasticized material fed in by extruder 1 is pressed radially inwardly between separating discs 61 from an outer separating edge 63 of the discs 61 and the conveying channel 53. Solid matter is thereby trapped at screening gaps (not shown) which are formed at separating edges 63, while the purified material flows through channels 64 and slots 55 into a central channel 56. Channel 56 opens into a nozzle 69 provided on separating head 51, therefrom the regenerated material is discharged as a foil 70.

Figure 9:
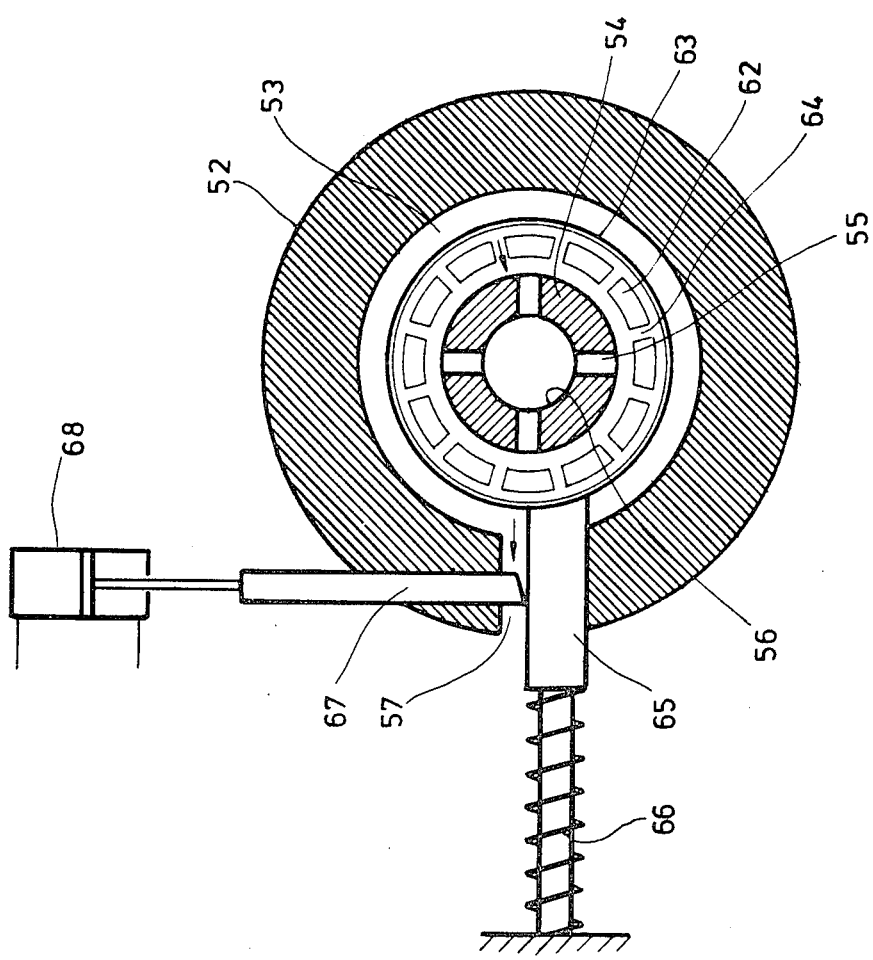
FIG. 9 is a sectional view taken along the line IX—IX of FIG. 8.

To remove the solid matter with the screening gaps, an aperture 57 is provided in housing 52 as shown in FIG. 9, which can be opened by means of a slide 67 operable by servo mechanism 68. In addition, a scraper 65 is provided extending through aperture 57 and pressed against separating disc 61 by means of a spring 66. Scraper 65 removes the material particles which accumulate at screening gaps. This material may be reused again. The inventive arrangement practically eliminates clogging and insures trouble-free operation of the separating head 51.

The discs could be successively arranged in a closely spaced relationship within the housing so that spaces therebetween act as screening passages.

While specific embodiments of the invention have been shown and described in detail to illustrate the application of the principles of the invention, it will be understood that the invention may be embodied otherwise without departing from such principles.

What is claimed is:

1. A screening device for separating a plasticized material from a mixture of plasticized material and non-plasticized solid material comprising, a separating head for receiving the materials, said head including a housing having a bore extending therethrough intermediate an entrance end and an exit end for receiving and passing the materials, material supply means connected to said head to supply the materials to the entrance end of the bore, a plurality of successively arranged annular discs arranged in a closely spaced relationship with each other in said bore, said discs having opposite side faces, each disc having a peripheral surface and a central aperture extending between its side faces defining an inner surface, said discs being concentrically aligned about a central axis so that said inner surfaces define a central bore in said housing bore, said discs being shaped and located relative to each other so as to define a radially extending passage between adjacent side faces of successive discs, said passage being dimensioned to screen said passage from receiving the non-plasticized solid material, said material supply means delivering the mixture to at least one of said surfaces of said discs so as to expel at least part of the plasticized material through each of said passages and convey at least part of the mixture including the solid material to said at least one surface, means connected to said discs for rotating said discs, and a scraper abutting said at least one surface for scraping the solid material therefrom.

2. A screening device according to claim 1, wherein said at least one of said surfaces comprises said peripheral surface in said housing bore, said exit end of said housing defining an aperture for the outlet of solid material scraped from said peripheral surface, said scraper extending through said aperture and including biasing means for biasing said scraper against said peripheral surface, and a slide mounted for movement into and out of said aperture to open and close said aperture.

3. A screening device according to claim 1, wherein said at least one surface comprises said peripheral surface, said means for delivering the mixture comprising a housing, a screw conveyor rotatably mounted in said housing defining an extrusion passage for delivering the mixture to said peripheral surface, said means for rotating said annular discs comprising a sleeve extending from said screw conveyor and connected to said annular discs at said inner surface thereof, said sleeve defining a central passage and including radially extending passages communicating said central passage with said passage between adjacent side faces of successive discs.

4. A screening device according to claim 1, wherein said passage comprises an outer circular channel adjacent said peripheral surface and an inner circular channel adjacent said inner surface with radially extending openings communicating said channel.

* * * * *